No. 895,260. PATENTED AUG. 4, 1908.
A. GÜTZLAFF & G. KOENIG.
WEDGING DEVICE.
APPLICATION FILED MAY 13, 1907.
2 SHEETS—SHEET 1.
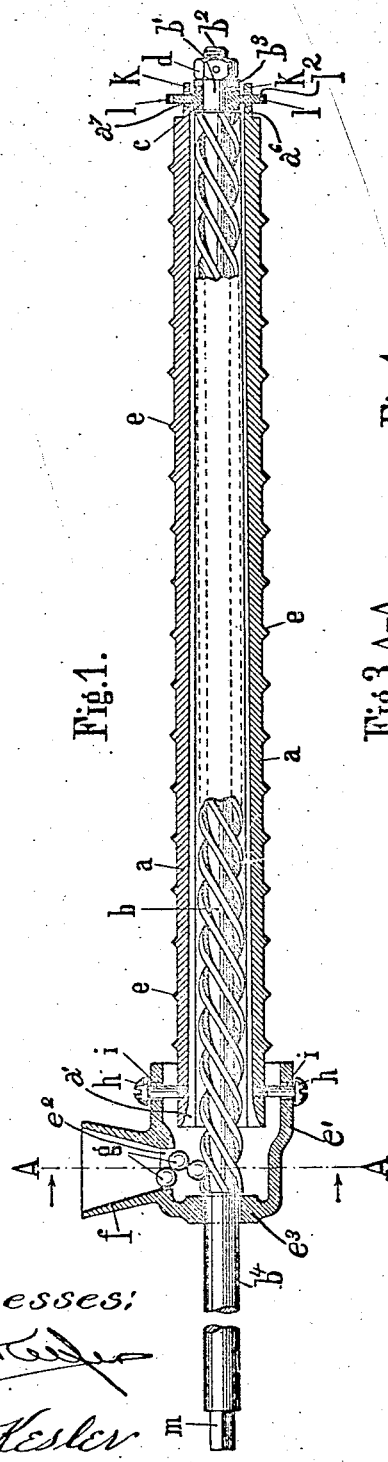
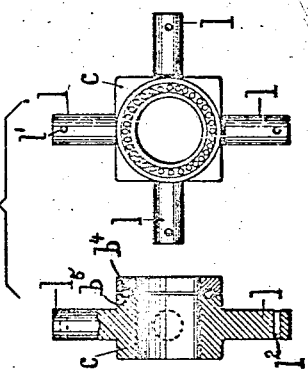
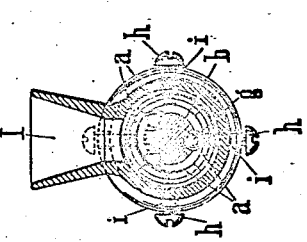
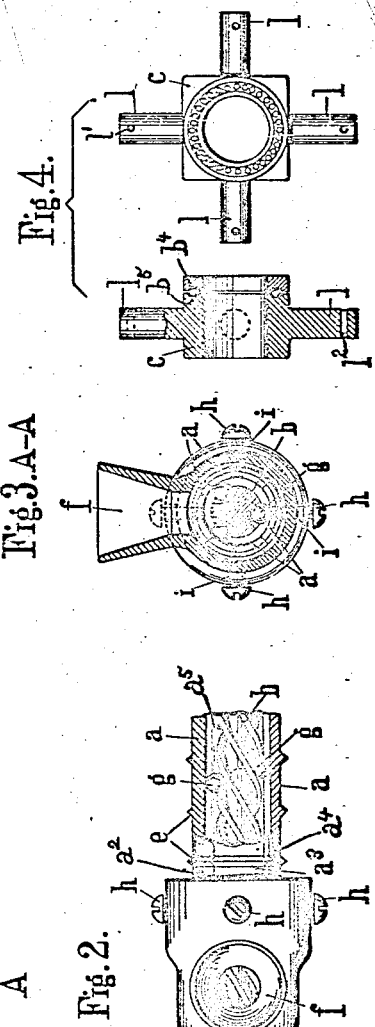

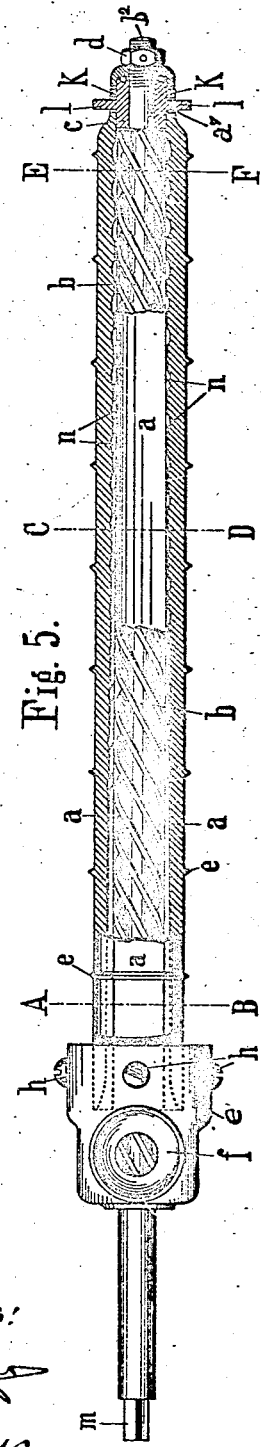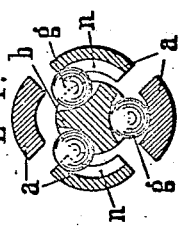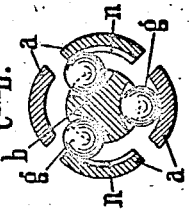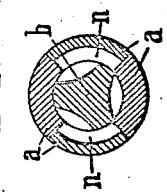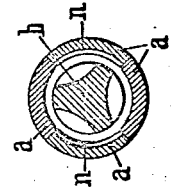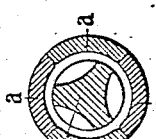

UNITED STATES PATENT OFFICE.

ADOLF GÜTZLAFF AND GEORG KOENIG, OF REDEU, SAAR, GERMANY.

WEDGING DEVICE.

No. 895,260.   Specification of Letters Patent.   Patented Aug. 4, 1908.

Application filed May 13, 1907. Serial No. 373,487.

*To all whom it may concern:*

Be it known that we, ADOLF GÜTZLAFF, miner, and GEORG KOENIG, captain miner, subjects of the Kingdom of Prussia, Germany, residing at Redeu, Saar, Germany, have invented certain new and useful Improvements in Wedging Devices, of which the following is a specification.

This invention relates to wedging devices for wedging down coal or rock bored or undercut on two or more sides; and the object thereof is to provide a device of such class in a manner as hereinafter set forth, whereby the wedging effect is produced by spherical bodies which are advanced by a worm shaft positioned within an expansible tool.

A further object of the invention is to provide a wedging device for the purpose set forth whereby spherical bodies of varying diameters may be employed so as to render it possible to wedge down the toughest rock with the smallest amount of force, and in this connection it will be stated that, generally, the work will be commenced with a set of spherical bodies of smaller diameter and this set be advanced to the end of the tube. If such set does not produce the desired wedging effect it is removed from the tube and replaced by a set of spherical bodies of larger diameter.

Further objects of the invention are to provide a wedging device which shall be simple in its construction, strong, durable, efficient in its use, readily operated and set up and comparatively inexpensive to manufacture.

With the foregoing and other objects in view the invention consists in the novel construction, combination and arrangement of parts hereinafter more specifically described and illustrated in the accompanying drawings, wherein is shown the preferred embodiment of the invention, but it is to be understood that changes, variations and modifications can be resorted to which come within the scope of the claims hereunto appended.

In the accompanying drawings, wherein like characters denote corresponding parts throughout the several views, Figure 1 is a longitudinal sectional view of a wedging device in accordance with this invention; Fig. 2 is an elevation of the forward part thereof; Fig. 3 is a section along line A—A of Fig. 1; Fig. 4 is a detail illustrating the spider for coupling the worm shaft to the tube; Fig. 5 illustrates a modification in sectional elevation; Fig. 6 is a section on line A—B of Fig. 5; Fig. 7 is a section on line C—D of Fig. 5; Fig. 8 is a section on line E—F of Fig. 5; Fig. 9 is a section on line C—D of Fig. 5, when the parts are in wedging position, and, Fig. 10 is a section along line E—F when the parts are in maximum wedging position.

Referring to Figs. 1 to 4 of the drawings, $a$ denotes an elongated expansible tube having the bore thereof gradually tapering towards one end and the other end $a'$ thereof flared. The tube $a$ is split into a plurality of longitudinally-extending sections (as shown four in number) and which are indicated by the reference characters $a^2$, $a^3$, $a^4$, and $a^5$. The said sections are adapted to separate transversely of their length during the wedging operation and by a means hereinafter referred to. One end of each of said sections is reduced, as at $a^6$ and provided with an aperture $a^7$ through which extends an arm $l$ of a collar $c$, the arms $l$ and collar $c$ constituting a spider and by such an arrangement allows of one end of each of the shiftable sections of the tube $a$ to be moved outwardly through a means to be hereinafter referred to. The movement of the contracted end of the sections of the tube $a$ is limited in an outward direction by pins $l'$ extending through openings $l^2$ formed in the outer end of the arms $l$. Surrounding that end of the tube $a$ which is not provided with the contracted portion, is an annular cap-piece $e'$ having an opening $e^2$ with which communicates a funnel $f$, the latter being arranged in proximity to the closed end $e^3$ of the cap-piece $e'$. The cap-piece $e'$ is furthermore provided with a series of openings $i$ through which extend headed screws $h$. The inner or threaded part of each of the screws $h$ fixedly engages in the sections of the tube $a$—that is to say, a headed screw $h$ engages with each of the sections of the tube $a$. The diameter of the openings $i$ through which the screws $h$ extend is such as to allow the screws to readily pass through said openings when the sections of the tube are shifted away or towards the axis thereof. The diameter of the cap-piece $e'$ is such with respect to the diameter of the tube $a$ as to allow of the movement of the tube sections when these latter are shifted in either direction.

Arranged within the cap-piece $e'$ and extending into the tube $a$ and of a length as to terminate in close proximity to the contracted portion $a^6$ of the tube $a$, is a worm shaft $b$ having a triple thread with a lefthand twist. One end of the worm shaft $b$ is contracted, as at $b'$ and carries the collar $c$, one face of the collar abutting against the terminus of the threads of the worm shaft at one end. The collar $c$ is maintained in position upon the contracted portion $b'$ of the worm shaft through the medium of the nut $d'$, which engages with a series of threads $b^2$ formed upon the contracted portion $b'$ of the said shaft $b$. Interposed between the nut $d$ and the outer edge of the collar $c$ is a bearing washer $b^3$ having a groove in its inner face as at $b^4$ constituting one-half of a ball race. The outer edge of the collar $c$ is grooved as at $b'$, said groove $d'$ opposing the groove $b^4$ and constituting the other half of the ball race. The grooves $b^4$ and $b^5$ form a ball race and mounted in said race are the bearing balls $k$. By the foregoing arrangement the collar $c$ is not only secured upon the worm shaft $b$ but also such arrangement constitutes a bearing for the contracted end of said worm shaft. The shank of the worm shaft $b$ extends through the end $e^3$ of the cap-piece $a'$ and has its outer terminus squared as at $m$ whereby said shank can be connected to an operating means for rotating the shank.

The reference character $g$ denotes a plurality of spherical wedging bodies which are fed through the channels formed by the threads of the worm shaft. The threaded portion of the worm shaft extends below the opening $a^2$ which constitutes an outlet for the funnel or hopper $f$.

Referring to Figs. 5 to 10 of the drawings, the construction of the device shown thereby is similar to that shown in Figs. 1 to 4, with the exception that the inner face of the tube $a$ has a portion of its length provided with the grooves $n$. Said grooves $n$ terminate at a point removed from that end of the tube to which is connected the cap-piece $e'$. The grooves $n$ extend in an opposite direction with respect to the threads of the worm shaft $b$ and the function thereof is to receive the wedging bodies so as to discontinue the expanding of the sections when occasion so requires.

The tube $a$ shown in Fig. 1, as well as that shown in Fig. 5, is formed with peripheral ribs $e$ substantially V-shaped in cross section. These ribs $e$ are arranged at intervals throughout the periphery of the tube $a$ and are adapted to prevent the tube from slipping back when forced into a drill or bore opening.

The construction shown in Figs. 1 to 4 is to be used when the portions of the coal or stone are laid bare on more than two surfaces, while the construction shown in Figs. 5 to 10, however, is only used when the portions of the coal or stone are laid bare on two surfaces.

The operation of the device is as follows: It will be assumed that it has been inserted in an opening so that the hopper will stand upright. Thereupon a set of spherical wedging bodies $g$ is introduced into the hopper and dropped into the channels of the worm shaft. The latter is then turned to the right. As the worm shaft has a triple thread, each of the channels between the threads will take up a body $g$ which will move down the shaft. The spherical bodies will be pressed at an angle of 60° to each other against the wall of the tube at a distance equal to the depth of the thread. While advancing the spherical bodies will turn round their axes and when the first set of bodies has reached the end of the tube without having a sufficient effect, said set of bodies can be returned by turning the shaft to the left. They can then be removed and a new set of bodies replaced of greater diameter so that the necessary wedging action will be imparted to the sections of the tube.

In the construction shown in Figs. 5 to 10 the spherical bodies will, after having passed the first third of the total length of the tube, enter the grooves $n$, commencing at such point and consequently exert no pressure on the sections of the tube as will be evident.

What we claim is—

1. A wedging device for the purpose set forth comprising an expansible tube having a tapering bore and formed of sections adapted to separate transversely of their length, spherical wedging bodies adapted to travel within the tube and engage the sections to expand the tube, and a screw shaft arranged within the tube for causing the travel of said bodies.

2. A wedging device for the purpose set forth comprising an expansible tube having a tapering bore and formed of sections adapted to separate transversely of their length, spherical wedging bodies adapted to travel within the tube and to engage said sections thereby expanding the tube, means arranged within the tube for causing the travel of said bodies, and means for limiting the movement in one direction of the sections of the tube.

3. A wedging device comprising an expansible tube having a tapering bore and formed of sections adapted to separate transversely of their length, means for connecting said sections together and for allowing of the shifting of said sections, spherical bodies traveling through the tube and engaging the sections thereby expanding the tube, and means for causing the travel of said bodies.

4. A wedging device for the purpose set forth comprising an expansible tube having a tapering bore and formed of sections adapted to separate transversely of their length, spherical wedging bodies adapted to travel within the tube and to engage the sections, thereby expanding the tube, means arranged within the tube for causing the travel of said bodies, said tube having a portion of the length of the inner face thereof provided with grooves adapted to receive said wedging bodies, thereby causing the discontinuing of the expanding of the tube.

5. A wedging device for the purpose set forth comprising an expansible tube having a tapering bore and formed of sections adapted to separate transversely of their length, spherical wedging bodies adapted to travel within the tube and to engage the sections thereby expanding the tube, means arranged within the tube for causing the travel of said bodies, said tube having a portion of the length of the inner face thereof provided with grooves adapted to receive said wedging bodies, thereby causing the discontinuing of the expanding of the tube, and means for limiting the movement in one direction of said sections.

6. A wedging device comprising an expansible tube having a tapering bore and formed of a plurality of sections adapted to separate transversely of their length, means for connecting said sections together and for allowing of the shifting of said sections, traveling spherical bodies moving within the tube and adapted to engage said sections thereby expanding the tube, said tube having a portion of the length of its inner face provided with grooves adapted to receive said bodies thereby causing a discontinuing of the expanding of the tube.

7. A wedging device comprising an expansible tube having a tapering bore and formed of a plurality of sections adapted to separate transversely of their length, means for connecting said sections together and for allowing of the shifting of said sections, traveling spherical bodies moving within the tube and adapted to engage said sections thereby expanding the tube, said tube having a portion of the length of its inner face provided with grooves adapted to receive said bodies thereby causing a discontinuing of the expanding of the tube, and means arranged in the tube for causing the travel of said bodies.

8. A wedging device comprising an expansible tube having a tapering bore and formed of a plurality of sections adapted to separate transversely of their length, means for connecting said sections together and for allowing of the shifting of said sections, traveling spherical bodies moving within the tube and adapted to engage said sections thereby expanding the tube, said tube having a portion of the length of its inner face provided with grooves adapted to receive said bodies thereby causing a discontinuing of the expanding of the tube, means arranged in the tube for causing the travel of said bodies, and means for limiting the movement in one direction of the sections.

9. A wedging device for the purpose set forth comprising an expansible tube having a tapering bore and formed of a plurality of sections adapted to separate transversely of their length, means for connecting said sections together and for allowing of the shifting of said sections, spherical bodies traveling through the tube and engaging with the sections for expanding the tube, and a worm shaft for causing the travel of said bodies, said tube having a portion of its inner face formed with grooves adapted to receive said bodies thereby causing a discontinuing of the expanding of the tube.

10. A wedging device comprising an expansible tube having a tapering bore and formed of a plurality of sections adapted to separate transversely of their length, a rotatable worm shaft arranged within said tube, and spherical bodies carried by said shaft and adapted to engage the inner face of the sections for expanding the tube.

11. A wedging device comprising an expansible tube having a tapering bore and formed of a plurality of sections adapted to separate transversely of their length, a rotatable worm shaft arranged within said tube, spherical bodies carried by said shaft and adapted to engage the inner face of the sections for expanding the tube, and means for limiting the outward movement of the sections and for connecting the sections together.

12. A wedging device comprising an expansible tube having a tapering bore and formed of a plurality of sections adapted to separate transversely of their length, a rotatable worm shaft arranged within said tube, and spherical bodies carried by said shaft and adapted to engage the inner face of the sections for expanding the tube, said tube having its inner face provided with grooves, said grooves terminating at a point removed from the entrance end of said tube, said grooves adapted to receive said bodies, thereby causing a discontinuing of the expanding of the tube.

13. A wedging device comprising an expansible tube having a tapering bore and formed of a plurality of sections adapted to separate transversely of their length, a rotatable worm shaft arranged within said tube, spherical bodies carried by said shaft and adapted to engage the inner face of the sections for expanding the tube, said tube having its inner face provided with grooves, said grooves terminating at a point removed from the entrance end of said tube, said grooves adapted to receive said bodies, thereby causing a discontinuing of the expanding of the tube, and means for limiting the outward movement of the sections and for connecting the sections together.

14. A wedging device comprising an expansible tube having a tapering bore and formed of a plurality of sections adapted to separate transversely of their length, a rotatable worm shaft arranged within said tube, and spherical bodies carried by said shaft
5 and adapted to engage the inner face of the sections for expanding the tube, said tube having peripheral ribs.

In testimony whereof we have hereunto set our hands in the presence of two subscribing witnesses.

ADOLF GÜTZLAFF.
GEORG KOENIG.

Witnesses:
LUDWIG RECKTENWALD,
JOS. EDUARD ANGEL.